July 29, 1930.　　　D. L. SWENDSÉN　　　1,771,738

CHUCK ARRANGEMENT

Filed Jan. 14, 1927

DAVID LEONARD SWENDSÉN
INVENTOR;

By [signature]
his Attorney

Patented July 29, 1930

1,771,738

UNITED STATES PATENT OFFICE

DAVID LEONARD SWENDSÉN, OF NORRKOPING, SWEDEN

CHUCK ARRANGEMENT

Application filed January 14, 1927, Serial No. 161,076, and in Sweden May 28, 1926.

This invention refers to a chuck construction to hold the head of a screw blank, which is to be threaded. The novelty of the invention lies in the fact that the jaws of the chuck are opened and closed by a cam controlled lever arrangement, whereafter upon the closing of the jaws around a blank a spring-pressed, nonrotating screw arresting means is pressed against the head of the screw blank, which screw arresting means at the turning of the blank snaps into the slot of the blank head. After the snapping of the spring-pressed screw arresting means, a part surrounding the same is pressed against the head of the blank, through a spring pressed and cam controlled lever arrangement, so that the blank is safely held in its position during the threading operation.

Figure 1:
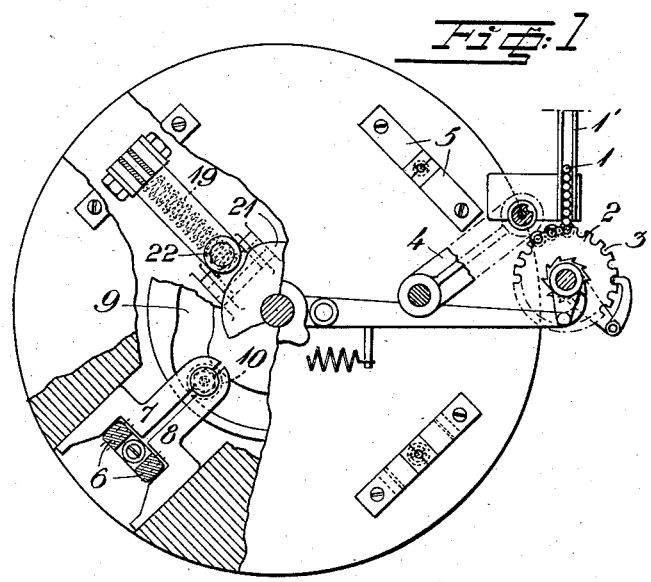
Figure 2:
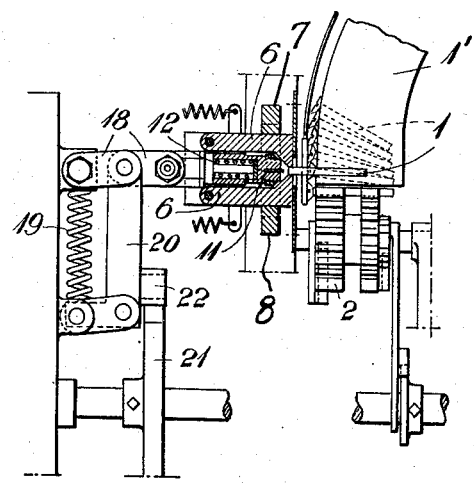

A form of execution of a chuck corresponding to the invention is shown in the accompanying drawing, where:

Fig. 1 shows the arrangement for holding the head of the blank to be threaded in front view and partly in section, whereas Fig. 2 shows the same arrangement from the side and partly in a lengthwise section.

The blanks 1, which from the chute 1' are placed on the slotted drum 2, are caught by the slots 3 of the said drum and by means of an arm 4 which is swingably mounted and carries at its end a rotatable chuck for grasping the shank of each blank, each one placed in a chuck 5 with jaws 6. The chucks 5 are equidistantly arranged on a rotating plate which carries the chuck operating means on its rear face. The jaws 6 of the chuck are closed around the blank through a twopart lever arrangement 7 and 8, which is operated through a cam track 9 and a roller arranged in the same. Hereafter the nonrotating screw arresting means 11 is pressed against the blank head with a comparatively slight pressure, derived from a spring 12, so that the screw arresting means 11 after a turning of the blank after the closing of the jaws easily catches into the slot of the blank head. Immediately upon the catching of the screw arresting means into the slot, a sleeve formed part surrounding the spring 12 and the screw arresting means is pressed against the head of the screw blank with great power through a lever arrangement 18 consisting of two links pivoted together, one of which is fixed to a fixed point and the other of which is fixed to said sleeve, said links being joined with an L-shaped lever at their pivot point. The lower end of the L-shaped lever is connected at the end of its short leg as shown in dotted lines in Figure 2 to one end of a compression spring 19 the other end of which works against a fixed point. At the lower end of the long leg of the L-shaped lever is a roller 22 working on a cam 21. The lever arrangement 18 is operated by the spring 19 and governed by the cam 21, so that the head of the blank is safely held in its position during the threading operation. After the threading the lever arrangement 18 is opened by overcoming the power of the spring 19 i. e. bent upwards, by reason of the fact that a roller 22 is pushed upwardly by the cam disc 21, whereafter the blank can be taken out.

Claims:

1. A chuck for holding screw blanks during a threading operation comprising jaws, a pair of sliding arms surrounding said jaws, said arms being varying distances apart at different points and being operated by cam means for opening and closing said jaws, screw arresting means for engaging a slot in the screw to be threaded, after said jaws are closed, arranged within said jaws, a sleeve surrounding said screw arresting means and adapted to engage the head of the screw to be threaded, a lever at the end of said sleeve, a second lever pivoted to said first mentioned lever, means to bend said levers at their pivot point to withdraw said sleeve from screw engaging position and spring means for straightening said levers out to press said sleeve against said screw and hold it securely in place.

2. A chuck for holding screw blanks during a threading operation comprising jaws, a cam for opening and closing said jaws, a pair of sliding arms surrounding said jaws, said arms being varying distances apart at different points and being operated by said cam, screw arresting means for engaging a slot in the screw to be threaded, after said jaws are closed, arranged within said jaws, a sleeve surrounding said screw arresting means and adapted to engage the head of the screw to be threaded, a lever at the end of said sleeve, a second lever pivoted to said first mentioned lever, means to bend said levers at their pivot point to withdraw said sleeve from screw engaging position, said means comprising an L-shaped lever having the free end of its long leg pivoted at the pivot point of said levers and having a roller at the other end of its long leg riding on a cam, whereby, when said cam presses against said roller said levers are bent upwardly at their pivot point and said sleeve is withdrawn from screw engaging position, and means to return said sleeve to screw engaging position comprising a compression spring working from a fixed point and pressing against the short leg of said L-shaped lever, whereby when said cam is removed said spring presses said L-shaped lever down, straightens out said pivoted levers and presses said sleeve against said screw.

In testimony whereof I have affixed my signature.

DAVID LEONARD SWENDSÉN.